United States Patent [19]

Kan et al.

[11] 3,933,699

[45] Jan. 20, 1976

[54] CATALYST-REACTANT SYSTEMS FOR THE PREPARATION OF CARBODIIMIDE FOAMS

[75] Inventors: Peter T. Kan, Plymouth; Moses Cenker, Trenton, both of Mich.

[73] Assignee: BASF Wyandotte Corporation, Wyandotte, Mich.

[22] Filed: Oct. 2, 1974

[21] Appl. No.: 511,113

[52] U.S. Cl. ........ 260/2.5 BF; 252/426; 260/2.5 AC
[51] Int. Cl.² ................. C08G 18/14; C08G 18/18; C08G 18/20
[58] Field of Search.... 260/2.5 BF, 2.5 AC, 2.5 AT, 260/77.5 AC, 75 NC; 252/426

[56] References Cited
UNITED STATES PATENTS

| | | | |
|---|---|---|---|
| 3,020,262 | 2/1962 | Speranza | 260/77.5 AC |
| 3,314,901 | 4/1967 | Daumiller | 260/2.5 AC |
| 3,743,626 | 7/1973 | Emmons | 260/2.5 AC |
| 3,793,236 | 2/1974 | Ashida | 260/77.5 AC |

OTHER PUBLICATIONS

Roberts & Caserio, *Basic Principles of Organic Chemistry,* W. A. Benjamin Inc. N.Y., 1965, pp. 486–487.

*Primary Examiner*—Donald E. Czaja
*Assistant Examiner*—C. Warren Ivy
*Attorney, Agent, or Firm*—Bernhard R. Swick; Joseph D. Michaels; Robert E. Dunn

[57] ABSTRACT

Rigid cellular foams characterized by carbodiimide linkages are prepared by the catalytic condensation of an organic polyisocyanate in the presence of a catalytically sufficient amount of a carbodiimide catalyst and an exotherm generating reactant which is either (a) an oxazolidine or (b) an enamine. The foams hereof are characterized by excellent flame retardancy, weight retention and low friability.

12 Claims, No Drawings

CATALYST-REACTANT SYSTEMS FOR THE PREPARATION OF CARBODIIMIDE FOAMS

BACKGROUND OF THE INVENTION

1. Field of the Invention

The present invention pertains to the preparation of rigid cellular foams. More particularly, the present invention relates to the preparation of rigid cellular foams characterized by carbodiimide linkages. Even more particularly, the present invention relates to the preparation of rigid cellular foams characterized by carbodiimide linkages from catalyst-reactant systems.

2. Prior Art

There has been disclosed heretofore the preparation of rigid cellular foams characterized by carbodiimide linkages. See, inter alia, U.S. Pat. Nos. 3,645,923; 3,717,596; 3,772,217; 3,723,366, etc. Generally, these compositions are prepared by the catalytic condensation of an organic polyisocyanate in the presence of a carbodiimide catalyst, such as a 2,4,6-tris(dialkanolamino)-s-triazine.

To promote the incorporation of isocyanurate groups into the resulting foams, the prior art, as exemplified above, has taught the use of co-catalyst systems comprising a carbodiimide catalyst and an isocyanate trimerization catalyst. The use of trimerization catalysts, while enhancing the flame retardancy of the foams, provides highly crosslinked polymers. As a result thereof, the foams produced from such co-catalyst systems tend to be characterized by high friability. This, in turn, necessitates the use of friability decreasing additives and the like, thereby increasing the cost of such foams.

Recognizing the fact that carbodiimide catalysts do, in and of themselves, cause trimerization of isocyanates, it would be most beneficial to employ such catalysts in combination with other catalysts or reactants which would negate the problems of friability while not diminishing the inherent qualities of the foams under consideration herein. It is to this end to which the present invention is directed.

SUMMARY OF THE INVENTION

In accordance with the present invention rigid cellular foams characterized by carbodiimide linkages are prepared by the catalytic condensation of an organic polyisocyanate in the presence of a carbodiimide catalyst and an exotherm generating reactant. The exotherm generating reactant is either an oxazolidine or an enamine.

The use of the oxazolidine is further enhanced by the conjoint use thereof with a Lewis acid.

The oxazolidine or enamine hereof is generally employed in an amount ranging from about 5 to 50 parts by weight thereof per 100 parts by weight of organic polyisocyanate.

For a more complete understanding of the present invention reference is made to the following detailed description and accompanying examples.

DESCRIPTION OF THE PREFERRED EMBODIMENTS

The present invention, as noted, provides rigid cellular foams characterized by carbodiimide linkages. The foams hereof are prepared by the catalytic condensation of an organic polyisocyanate in the presence of a catalytically sufficient amount of a carbodiimide catalyst and an exotherm generating reactant which is either (a) an oxazolidine or (b) an enamine.

The catalyst-reactant systems hereof can be deployed as either a mixture thereof or an individual components added to the organic polyisocyanate.

At the outset it is to be noted that the foams hereof, although denoted as "carbodiimide foams" do contain minor amounts of free isocyanate, as well as having isocyanurate groups present therein. However, the dominant group within the foams is the carbodiimide linkage, i.e.,

-N=C=N-

Thus, the foams hereof are defined as carbodiimide foams.

As hereinbefore noted, it has been found that the use of an oxazolidine or an enamine conjointly with a carbodiimide catalyst provides carbodiimide foams of reduced friability without negating the inherent qualities of such foams. Although not wishing to be bound by any theory, it appears that the reaction of an oxazolidine or an enamine with an organic polyisocyanate is a highly exothermic reaction. The heat generated thereby, in turn, activates the carbodiimide catalyst.

Moreover, the reaction of an oxazolidine or an enamine with an organic polyisocyanate appears to produce polymers of reduced cross-linking, as contrasted with the degree of cross-linking with isocyanate trimerization catalysts. The lesser degree of cross-linking, thus, provides foams of reduced friability.

It should be noted that the reaction between an isocyanate and an enamine has been reported. See, inter alia, Cook, *Enamines: Synthesis, Structure, and Reactions*, Ed., Marcel Dekker, New York, N.Y. 1969. The reaction of enamines and organic polyisocyanates is presumed to provide either substituted ureas, amides, dicarboxamides or β-lactams, depending on the nature of the reactants and the reaction conditions. However, the use of an enamine in the preparation of cellular products has not heretofore been reported. The reaction of an organic polyisocyanate and an oxazolidine has, also, not been reported heretofore in the preparation of the foams under consideration herein. However, in U.S. Pat. No. 3,793,236 there is disclosed oxazolidine-modified isocyanurate foams prepared by the trimerization of isocyanateterminated polyoxazolidine.

In carrying out the present invention any enamine or oxazolidine can be used herein. Thus, for example, enamines corresponding to the formula:

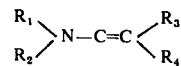

wherein $R_1$, $R_2$, $R_3$, $R_4$, are, individually, either aliphatic, alicyclic, aromatic, alkylaryl, or arylalkyl can be employed herein.

The enamines are generally prepared by the condensation of an aldehyde or ketone with a secondary amine followed by the acid catalyzed dehydration thereof with a suitable acid catalyst such as p-toluenesulfonic acid. The secondary amines may be simple dialkylsubstituted such as dimethylamine, diethylamine, di-n-propylamine, di-i-propylamine, cyclic amines, such as azetidine, pyrolidine, piperazine, morpholine and the like.

Useful aldehydes and ketones include, for example, aliphatic, alicyclic, aromatic, mixed aliphatic and aromatic, as well as heterocyclic compounds. Representative compounds include formaldehyde, acetaldehyde, propinaldehyde, acetone, 2-butanone, cyclopentanone, 3-oxotetrahydrothiophene, 2-formalcyclohexanone, and the like.

It should also be noted that the enamines may contain reactive substituents such as hydroxyl, carboxyl, mercaptan groups and the like. These compounds are prepared from appropriately substituted secondary amines and aldehydes and ketones.

It should, further, be noted that if the secondary amine used to prepare the enamine contains more than one secondary amine group, its reaction with a monoaldehyde or ketone will produce the corresponding di, tri, or higher enamine, accordingly. If a polycarboxyl compound is used with a poly-secondary amine, the product will be polymeric, i.e., polyenamine. It is, thus, contemplated that any enamine can be efficaciously deployed herein. A more comprehensive listing of enamines can be found in the hereinbefore referenced text by Cook.

Oxazolidines are conventionally prepared by the intermolecular dehydration and cyclization of a ketone or aldehyde with a substituted alkanolamine wherein the amine is secondary and any such compound can, also, be efficaciously deployed.

Representative of the substituted alkanolamines having a secondary amine group which can be utilized herein include, for example, N-methylethanolamine, N-methylisopropanolamine, N-ethylethanolamine, N-ethylisopropanolamine, N-n-propylethanolamine, N-n-propylisopropanolamine, N-i-propylethanolamine, N-i-propylisopropanolamine, N-phenylethanolamine, N-phenylisopropanolamine, diethanolamine, diisopropanolamine, N,N'-bis(2-hydroxyethyl)-1,4-butanediamine, N-N'-bis(2-hydroxybutyl)-1,4-butanediamine, N,N'-bis(2-hydroxybutyl)-1,6-hexanediamine, N,N'-bis(2-hydroxyethyl)-1,6-hexanediamine and the like.

The useful aldehydes and ketones are those hereinbefore enumerated.

It should be noted that the enamines and oxazolidines deployed herein can be selectively varied to tailor the resulting foams prepared therefrom, based upon the reaction thereof with an isocyanate. For example, 1-piperidino-1-cyclohexene reacts with excess isocyanate to provide a vinylogous diamide by the following equation:

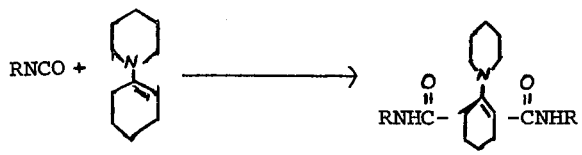

If the enamine contains no β-hydrogens, the reaction thereof with isocyanate provides a β-lactam, as illustrated by the following:

Exemplifying the use of a hydroxyl containing enamine to provide a urethane-amide is the following:

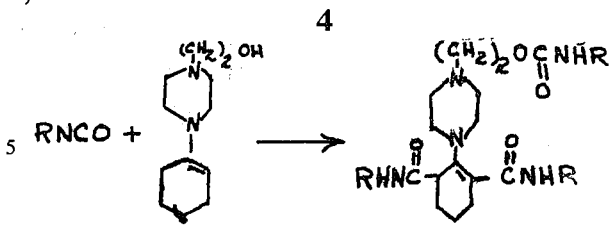

If the isocyanate is polyfunctional then, of course, the corresponding polymers are obtained.

Illustrative of the tailoring of properties with an oxazolidine is the reaction of 3-methyloxazolidine-2-spirocyclohexane with an isocyanate to provide a polymeric urea, as follows:

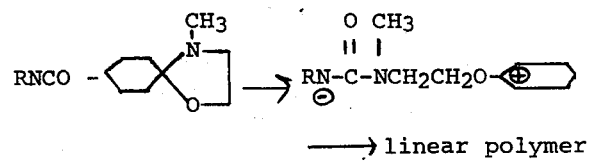

⟶ linear polymer

In practicing the present invention the preferred enamines are 1-piperdino-1-cyclohexene and N-isobutenylpyrrolidine. The preferred oxazolidine is 3-(2-hydroxyethyl)oxazolidine-2-spirocyclohexane.

In using an oxazolidine as a component in the systems hereof it is preferred that a Lewis acid, also, be employed. The Lewis acid causes a higher exotherm to be generated by the oxazolidine, thereby, enhancing its capabilities of activating the carbodiimide catalyst. Any conventional Lewis acid can be used, such as, ferric chloride, aluminum chloride, boron trifluoride, stannic chloride, and the like, but preferably ferric chloride. The Lewis acid is employed in an amount of about ten percent, by weight, based on the weight of the oxazolidine.

The enamine and oxazolidine are used as individual components or in admixture with a carbodiimide catalyst. Suitable carbodiimide catalysts include, for example, 2,4,6-tris(dialkanolamino)-s-triazine, as reported in U.S. Pat. No. 3,645,923; 2,4,6-tris(N-methylethanolamino)-s-triazine, as described in U.S. Pat. No. 3,717,596; as well as the unsymmetrical triazines disclosed in U.S. Pat. Nos. 3,806,475; 3,824,239 and 3,824,240. Any such catalyst can be used herein.

The foams hereof are prepared from any suitable organic polyisocyanate. Such polyisocyanates generally correspond to the formula:

R(NCO)$_z$ wherein R is a polyvalent organic radical selected from the group of aliphatic, aromatic, arylalkyl and alkylaryl organic radicals, as well as mixtures thereof; and Z is an integer corresponding to the valence number of R and is at least 2. Representative of the organic polyisocyanates contemplated herein include for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate and the like; the aromatic triisocyanates such as 4,4',4''-triphenylmethylene triisocyanate, such as 4,4'-dimethyldiphenylmethane-2,2',5,5'-tetraisocyanate, and the like; aralkyl polyisocyanates, such as xylylene diisocyanate; aliphatic polyisocyanates, such as hexamethylene-1,6-diisocyanate, lysine diisocyanate methylester and the like, and mixtures thereof. Other useful organic polyisocyanates include:

polymethylene polyphenylisocyanate,
hydrogenated methylene diphenylisocyanate,
m-phenylene diisocyanate,
naphthylene-1,5-diisocyanate,
1-methoxyphenyl-2,4-diisocyanate,
diphenylmethane-4,4'-diisocyanate,
4,4'-biphenylene diisocyanate,
3,3'-dimethoxy-4,4'-biphenyl diisocyanate,
3,3'-dimethyldiphenylmethane-4,4'-diisocyanate,
and the like.

These polyisocyanates are prepared by conventional methods in the art such as the phosgenation of the corresponding organic amine.

Still another class of organic polyisocyanates useful herein are isocyanate-terminated quasi-prepolymers. These quasi-prepolymers are prepared by reacting excess organic polyisocyanate or mixtures thereof with a minor amount of an active hydrogen-containing compound. Suitable active-hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyterminated polyurethane polymers, polyhydric polythioehters, alkylene oxide adducts of phosphorus-containing acids, polyacetals, aliphatic polyols, aliphatic thiols including alkane, alkene and alkyne thiols having two or more -SH groups; as well as mixtures thereof. Compounds which contain two or more different groups within the above-defined classes may also be used such as, for example, compounds which contain one -SH group and one —OH group.

Any suitable hydroxyl-containing polyester may be used such as are obtained, for example, from polycarboxylic acids and polyhydric alcohols. Any suitable polycarboxylic acid may be used as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, butyl-α-ethylglutaric acid, α,β-diethyl-succinic acid, isophathalic acid, terephtalic acid, hemimellitic acid, and 1,4-cyclohexanedicarboxylic acid. Any suitable polydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4-hydroxyphenyl)propane, commonly known as Bixphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ehtylene oxide, propylene oxide, butylene oxide, amylene oxide, and heteric or block copolymers of these oxides. The polyalkylene polyether polyols may be prepared from other starting materials such as tetrahydrofuran; alkylene oxide tetrahydrofuran mixtures; epihalohydrins such as epichlorohydrin; as well as aralkylene oxides such as styrene oxide. The polyalkylene polyether polyols may have either primary or secondary hydroxyl groups, and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol 7, pp. 257–262, published by Interscience Publishers, Inc. (1957) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxylcontaining polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 to about 95 percent. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two -SH groups may be used such as 1,2-ethanedithiol, 1,2-propanedithiol, 1,3-propanedithiol, and 1,6-hexanedithiol, alkene thiols such as 2-butene-1,4-dithiol, and alkyne thiols such as 3-hexyne-1,6-dithiol.

Other compounds which do not necessarily fit within any of the previously set forth classes of compounds which are quite suitable in the production of these other quasi-prepolymers compounds include the hydroxy-terminated polyurethane polymers such as a hydroxy-terminated polymer made by reacting the isocyanate with several moles of an alkylene glycol.

In preparing the rigid cellular foams herein, the exotherm generating reactant is employed in an amount ranging from about 5 to 50 parts thereof, by weight, per 100 parts by weight of organic polyisocyanate. Preferably, the reactant is employed in an amount ranging from about 15 to 40 parts thereof, by weight, per 100 parts by weight of organic polyisocyanate.

The carbodiimide catalyst is employed in an amount ranging from about 1 to 10 parts thereof, by weight, based on 100 parts, by weight, of organic polyisocyanate.

The catalyst and reactant system can be deployed as an admixture thereof or as individual components. In preparing the foams the system is added to the isocyanate and the mixture is stirred at the initiation temperature of the reaction until foam formation commences as evidenced by the generation of an exotherm. The initiation temperature may vary from room temperature to about 100°C, depending on the reactants.

In preparing the foams additional ingredients such as plasticizers, surfactants, fillers, additional blowing agents and the like can be used in a conventional manner.

For a more complete understanding of the present invention reference is made to the following examples. In the examples, which are illustrative and not limitative of the invention, all parts are by weight absent indications to the contrary.

EXAMPLE I

This example illustrates the preparation of a series of carbodiimide foams from a catalyst-reactant system of a carbodiimide catalyst and either (1) an enamine or (2) an oxazolidine and in the presence of ferric chloride, as a Lewis acid.

Into a suitable vessel equipped with heating means and stirring means was charged one hundred parts of an 80:20 weight mixture of 2,4- and 2,6-toluene diisocyanate (TDI). With stirring there was added thereto a blend of either (a) carbodiimide catalyst and enamine or (b) carbodiimide catalyst and the oxazolidine. The oxazolidine, where used, having pre-blended therewithin a Lewis acid.

In both catalyst-reactant systems a silicone surfactant was pre-blended therewith. The resulting mixture was mixed to the initiation temperature, as evidenced by the generation of an exotherm in the vessel and the commencement of foam formation.

A rigid cellular foam characterized by carbodiimide linkages and having reduced friability over previous foams was, thus, obtained.

The following table, Table I, sets forth the ingredients used to prepare the foams.

EXAMPLE II

Following the procedure of Example I, a series of carbodiimide foams of reduced friability were prepared from a catalyst-reactant system of 2,4,6-tris(N-methylethanolamino)-s-triazine (TMT), as the carbodiimide catalyst and N-isobutenylpyrrolidine (IBP) as the exotherm generating reactant, which were pre-blended in the presence of varying organic polyisocyanates.

Additionally, a surfactant and a plasticizer were added to the co-catalyst system prior to the reaction.

Pre-blended with the isocyanate was a supplemental blowing agent.

The following table, Table II, sets forth the ingredients and amounts thereof used to prepare the foams.

TABLE II

| Sample | TDI | CMDI[1] | IBP | TMT | Plasticizer[2] | Surfactant[3] | Blowing agent[4] | Exotherm °C[5] |
|---|---|---|---|---|---|---|---|---|
| 9 | 100 | — | 20 | 3 | 2 | 1 | — | 183 |
| 10 | 100 | — | 20 | 6 | 4 | 2 | — | 160 |
| 11 | 50 | 50 | 30 | 6 | 4 | 2 | — | 184 |
| 12 | 50 | 50 | 30 | 6 | 4 | 2 | 10 | 229 |
| 13 | 30 | 70 | 30 | 6 | 4 | 2 | 10 | 95 |
| 14 | 30 | 70 | 40 | 6 | 4 | 2 | 10 | 118 |
| 15 | 10 | 90 | 40 | 6 | 4 | 2 | 10 | 118 |

[1]Crude methylene diphenyl diisocyanate.
[2]Tris(2-chloroethyl)phosphate.
[3]Same as footnote f of Example I.
[4]1,1,2-Trichloro-1,2,2-trifluoroethane.
[5]Temperature at maximum exotherm during foaming.

EXAMPLE III

Following the procedure outlined in Example II, a series of carbodiimide foams of reduced friability were prepared from a plurality of organic polyisocyanates and a catalyst-reactant system of a carbodiimide catalyst and an oxazolidine having a Lewis acid added thereto.

In this example the catalyst-reactant system contained twenty parts of 3-(2-hydroxyethyl)oxazolidine-2-spirocyclohexane, as the oxazolidine, one part of ferric chloride, as the Lewis acid, and varying amounts of 2,4,6-tris(N-methylethanolamino)-s-triazine (TMT) as the carbodiimide catalyst.

The following table, Table III, sets forth the varying ingredients and amounts thereof used to prepare the cellular products hereof.

TABLE I

| | | Parts by Weight | | | | | |
|---|---|---|---|---|---|---|---|
| Sample | TDI | Exotherm Reactant | FeCl$_3$[d] | TMT[e] | Surfactant[f] | Init. Temp. °C | Exotherm[g] °C |
| 1 | 100 | 13.4[a] | — | 4.4 | 2.2 | 25 | 117 |
| 2 | 100 | 23.1[a] | — | 4.6 | 2.3 | 25 | 104 |
| 3 | 100 | 30.7[a] | — | 6.2 | 3.1 | 25 | 129 |
| 4 | 100 | 10 [b] | 0.2 | 5.0 | — | 50 | 120 |
| 5 | 100 | 15 [b] | 1.0 | 5.0 | — | 25 | 127 |
| 6 | 100 | 15 [b] | 0.3 | 5.0 | — | 25 | 126 |
| 7 | 100 | 15 [c] | 0.2 | 5.0 | — | 25 | 131 |
| 8 | 100 | 15 [c] | 0.2 | 5.0 | 1.0 | 25 | 131 |

[a]1-Piperidino-1-cyclohexane (an enamine).
[b]3-Methyloxazolidine-2-spirocyclohexane.
[c]3-(2-Hydroxyethyl)oxazolidine-2-spirocyclohexane.
[d]Ferric chloride, sublimed.
[e]2,4,6-Tris(N-methylethanolamino)-s-triazine, a carbodiimide catalyst.
[f]Polysiloxane surfactant sold by Dow Corning under the name DC-193.
[g]Temperature reached just prior to foaming.

TABLE III

| Sample | TDI | CMDI[1] | TMT | Plasticizer[1] | Surfactant[1] | Blowing Agent[1] | Init. Temp., °C |
|---|---|---|---|---|---|---|---|
| 16 | 50 | 50 | 5 | 2 | 2 | 13 | 25 |
| 17 | 50 | 50 | 7 | | | 12 | |
| 18 | 40 | 60 | 5 | | | 10 | |
| 19 | 40 | 60 | 7 | | | 10 | |
| 20 | 30 | 70 | 5 | | | 13 | |
| 21 | 30 | 70 | 7 | | | 13 | |
| 22 | 20 | 80 | 5 | | | 15 | |
| 23 | 20 | 80 | 7 | | | 15 | |
| 24 | 10 | 90 | 5 | | | 20 | |
| 25 | 10 | 90 | 7 | | | 20 | |
| 26 | — | 100 | 5 | | | 25 | |
| 27 | — | 100 | 7 | | | 25 | |

[1] See footnotes, 1, 2, 3, and 4, respectively, of Example II.

The foams of samples 16–27 were tested for physical properties, including flame retardancy, compressive strength at 10 percent deflection and tumbling friability, using the following test procedures:

| | |
|---|---|
| Compressive Strength | ASTM D-1621 |
| Tumbling Friability | ASTM C-1421 |
| Flame Retardancy (Butler Chimney Test) | ASTM D-3014 |

The results of these tests are set forth below in Table IV.

TABLE IV

| Sample | Density, pcf. | Comprehensive Strength 10% Deflection psi. | Closed Cell Content % | Tumbling Friability % Wt. Loss | Butler Chimney test | | |
|---|---|---|---|---|---|---|---|
| | | | | | Weight Retention % | Flame Height In. | Time To Self-extinguish sec. |
| 16 | 2.0 | 19.3 | 4 | 66 | 54 | 10 | 19 |
| 17 | 2.1 | 17.4 | 2 | 69 | 71 | | 17 |
| 18 | 2.3 | 26.0 | 1 | 37 | 63 | | 19 |
| 19 | 2.1 | 20.2 | 3 | 44 | 71 | | 18 |
| 20 | 2.2 | 25.2 | 6 | 39 | 54 | | 25 |
| 21 | 2.3 | 24.0 | 8 | 36 | 57 | | 23 |
| 22 | 2.2 | 24.3 | 95 | 36 | 50 | | 25 |
| 23 | 2.3 | 24.0 | 93 | 29 | 51 | | 23 |
| 24 | 2.2 | 27.2 | 100 | 26 | 49 | | 25 |
| 25 | 2.3 | 26.5 | 99 | 25 | 64 | | 11 |
| 26 | 2.0 | 16.6 | 99 | 27 | 43 | | 31 |
| 27 | 2.1 | 21.3 | 100 | 31 | 43 | | 33 |

It can be seen from a review of the data herein that the present invention provides rigid cellular carbodiimide foams of reduced friability than those heretofore obtained from prior catalytic systems. Furthermore, the flame retardancy of the present foams is not impaired since the carbodiimide catalyst promotes sufficient isocyanate trimerization.

Having thus described the invention what is desired to claim and secure by letters patent is:

1. A process for the preparation of rigid cellular foams characterized by carbodiimide linkages, consisting essentially of:
   catalytically condensing an organic polyisocyanate in the presence of a catalytically sufficient amount of carbodiimide catalyst and an effective amount of an exotherm generating reactant which is either (a) an enamine which is the reaction product of a secondary amine and an aldehyde or a ketone or (b) an oxazolidine.

2. The process of claim 1 wherein the exotherm generating reactant is an enamine.

3. The process of claim 2 wherein the enamine is selected from the group consisting of 1-piperidino-1-cyclohexene and N-isobutenylpyrrolidine.

4. The process of claim 1 wherein the exotherm generating reactant is an oxazolidine.

5. The process of claim 4 wherein the oxazolidine is selected from the group consisting of 3-(2-hydroxyethyl)oxazolidine-2-spirocyclohexane, and 3-methyloxazolidine-2-spirocyclohexane.

6. The process of claim 4 wherein the oxazolidine is reacted with the isocyanate in the presence of a Lewis acid.

7. The process of claim 1 wherein the exotherm generating reactant is present in an amount ranging from about five to fifty parts thereof, by weight, per one hundred parts by weight of organic polyisocyanate.

8. The process of claim 1 wherein the carbodiimide catalyst is 2,4,6-tris(N-methylethanolamino)-s-triazine.

9. A catalyst-reactant system for the preparation of rigid cellular plastic foams characterized by carbodiimide linkages consisting essentially of:
   a. a carbodiimide catalyst, and
   b. an exotherm generating reactant selected from the group consisting of (1) an enamine which is the reaction product of a secondary amine and an aldehyde or a ketone or (2) an oxazolidine.

10. The system of claim 9 wherein the exotherm generating reactant is an enamine.

11. The system of claim 9 wherein the exotherm generating reactant is an oxazolidine.

12. The system of claim 11 which further includes a Lewis acid.

* * * * *